(No Model.)

C. W. HUNT.
CLUTCH MECHANISM.

No. 587,208. Patented July 27, 1897.

Witnesses
Chas. H. Smith
J. Staib

Inventor
Charles W. Hunt
by L. W. Serrell & Son
Attys.

UNITED STATES PATENT OFFICE.

CHARLES W. HUNT, OF WEST NEW BRIGHTON, NEW YORK.

CLUTCH MECHANISM.

SPECIFICATION forming part of Letters Patent No. 587,208, dated July 27, 1897.

Application filed May 27, 1897. Serial No. 638,381. (No model.)

*To all whom it may concern:*

Be it known that I, CHARLES W. HUNT, a citizen of the United States, residing at West New Brighton, in the county of Richmond and State of New York, have invented an Improvement in Clutch Mechanism, of which the following is a specification.

Hoisting-drums and other devices have been actuated by friction from an adjacent wheel, the surfaces in contact being annular and beveled or V-shaped, there being a motion given endwise of the shaft to one of the parts to press it against the other or to allow such parts to separate, and in some instances this end motion has been given by a screw sleeve or nut upon a stationary screw sleeve or nut, one of the parts being turned in relation to the other.

In the present improvement I make use of two screw-sleeves, one within the other and surrounding the driving-shaft, and arms are provided that extend from the respective screw-sleeves and motions are given in opposite directions to the arms to apply the friction for rotating the drum or other device or for relieving such friction. By this improvement there is less risk of the parts becoming wedged too tightly together or of being inoperative through the wear, because the action of the screw-sleeves is greater in consequence of both the screw-sleeves being turned in opposite directions, and double the extent of movement will be given to the parts by swinging each arm a given number of degrees. Hence the present devices are more easily controlled by the attendant and wear much longer and are not liable to get out of order.

Figure 1:
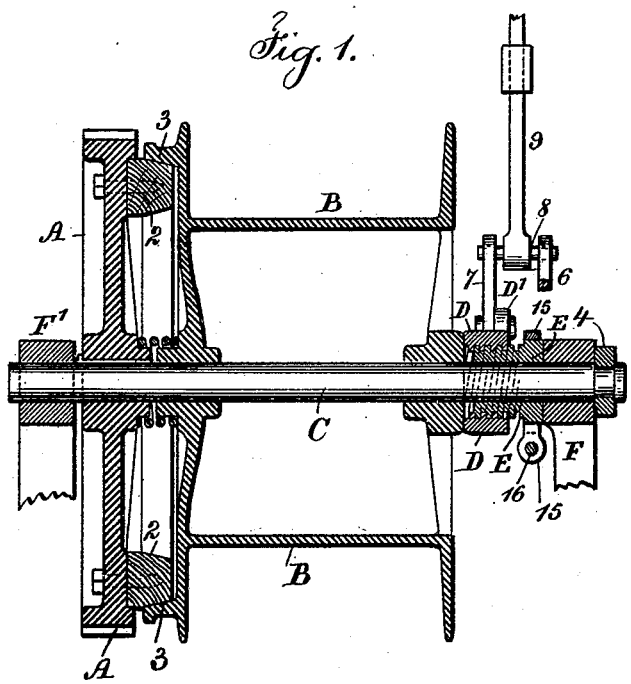
Figure 2:
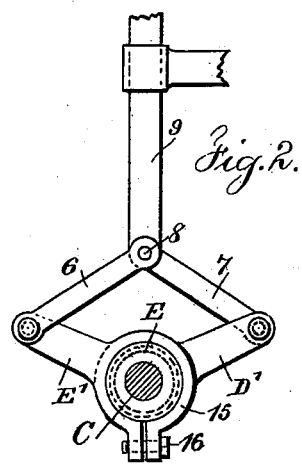
Figure 3:
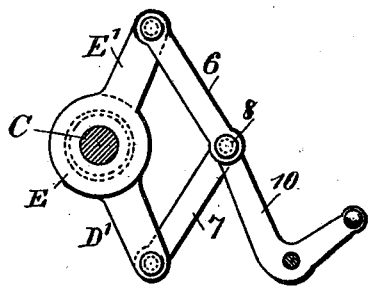
Figure 4:
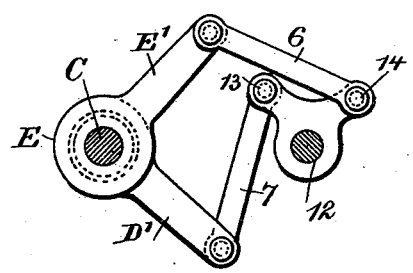

In the drawings, Figure 1 is a longitudinal section representing the present improvement as applied to a drum. Fig. 2 is an end view representing link connections to the arms and a reciprocating device for actuating the same. Fig. 3 shows a bent-lever connection for moving the links, and Fig. 4 shows a shaft and joint connections for the links.

A driving-wheel A is represented as fixed upon a shaft C and the hoisting-drum B as loose upon such shaft, the driving frictional device being composed of annular ribs 2 and 3, that engage each other by end pressure given to the drum; but it is to be understood that the present invention is available for applying or releasing any frictional mechanism between a rotating motor and the device to be moved.

The shaft is supported in suitable bearings F F' and there is a collar 4 around the shaft to receive the end thrust from the screw-sleeves, hereinafter described. This collar is represented as on the outside of the bearing F, so that the end thrust of the screw-sleeves D E may be between the inner side of the bearing F and the end of the drum B; but the collar 4 might be upon the other side of the bearing F, if desired.

The sleeve E is screw-threaded on its exterior surface and the sleeve D is screw-threaded upon its interior surface, the latter being screwed upon the former, and the length of the two sleeves D E when set together and in their normal positions is to correspond to the distance between the bearing F and the end of the drum B.

Upon the sleeve E is an arm E' and upon the sleeve D is an arm D', and these arms are provided with links 6 and 7, that are suitably connected together at one joint 8, and these links with the arms are similar to toggles, and when the joint 8 is moved in one direction the arms D' and E' are separated and when said joint 8 is moved in the other direction the arms are drawn nearer together, and the direction of the screw-threads is to be such that the length between the ends of the screw-sleeves will be increased when the arms are forced away from each other and decreased when the arms are drawn toward each other, or the reverse. Hence when the joint 8 is moved in one direction the barrel B will be pressed toward the wheel A and driven by a frictional contact, or the barrel will be released from such frictional contact by the arms being moved in the other direction.

Any suitable mechanism may be employed for giving motion in one direction or the other to the joint 8 or in giving motion in one direction or the other to the arms D' E'. In Fig. 2 a bar 9 is illustrated to which an endwise movement may be given by a lever or otherwise. In Fig. 3 the bent lever 10 is represented as adapted to give motion to the joint 8 for actuating the screw-sleeves, and in Fig. 4 a shaft 12 and joints 13 14 are represented for giving motion to the links 6 and 7 and moving the arms D' E' toward or from each other.

It is advantageous that the direction of inclination of the screw-threads shall be such that the rotation of the drum, acting by friction against the end of the screw-sleeve D, shall tend to turn that screw-sleeve in such a direction that the friction will be released by screwing the sleeve D toward the stationary bearing F, and I prefer to have the end of the sleeve E resting against the stationary bearing F, so that the friction may tend to hold this sleeve E stationary, so that there will be no risk of the screw-sleeves being acted upon by the motive power, so as to be tightened and injure any portion of the apparatus, and with this object in view I prefer to have the end of the sleeve E resting against the stationary bearing F rather than against the collar 4, if such collar intervenes between the screw-sleeve E and the bearing F instead of being upon the opposite side of such bearing, as illustrated. By these devices the mechanism acting upon the joint 8 holds the arms and sleeves from revolving with the shaft, and by giving motion to the joint 8 toward or from the shaft the links force the arms away from each other or draw them toward each other and give end motion by the sleeves to the drum to apply the friction or in the opposite direction to release the friction, and this mechanism is easily applied either to hoisting apparatus already constructed or to new work, and it is easily repaired and any wear may be compensated through the mechanism acting upon the joint 8 or by washers introduced between the end of the screw-sleeve and the part with which the same comes into contact.

It sometimes happens that the frictional surfaces wear to such an extent that the screw-sleeves have not sufficient movement to apply the necessary pressure. To provide for this condition, I connect one of the levers with its screw-sleeve by a clamping-eye 15, so that by loosening the screw 16 the eye of the lever can be turned around on the sleeve to the proper position and then again clamped, so that the screw and sleeve will move together, thus compensating for any wear of the parts.

I claim as my invention—

1. The combination with the friction devices upon a rotating shaft, of two sleeves loosely surrounding such shaft and one sleeve screwing upon the outside of the other, arms extending out one from each sleeve, and mechanism for moving the arms away from or toward each other simultaneously, substantially as set forth.

2. The combination with the friction devices upon a rotating shaft, of two sleeves loosely surrounding such shaft and one sleeve screwing upon the outside of the other, arms extending out one from each sleeve, and links connected with the ends of the arms and mechanism for acting upon such links and moving the arms toward or from each other, substantially as set forth.

3. The combination with the friction devices upon a rotating shaft, of two sleeves loosely surrounding such shaft and one sleeve screwing upon the outside of the other, arms extending out one from each sleeve, and links connected with the ends of the arms and a joint connecting the outer ends of the links and a lever acting upon such joint to move it toward or from the rotating shaft and apply or release the friction, substantially as set forth.

4. The combination with the friction devices upon a rotating shaft, of two sleeves loosely surrounding such shaft and one sleeve screwing upon the outside of the other, arms extending out one from each sleeve, and mechanism for moving the arms away from or toward each other simultaneously, there being a clamping-eye on one lever by which it is connected to the screw-sleeve and can be adjusted substantially as specified.

Signed by me this 24th day of May, 1897.

CHAS. W. HUNT.

Witnesses:
  GEO. T. PINCKNEY,
  S. T. HAVILAND.